US011993169B2

(12) United States Patent
TenHouten et al.

(10) Patent No.: US 11,993,169 B2
(45) Date of Patent: May 28, 2024

(54) VEHICLE CHARGING SYSTEMS AND METHODS OF OPERATING THEREOF

(71) Applicant: Intrinsic Power, Inc., Los Angeles, CA (US)

(72) Inventors: Broc William TenHouten, Lafayette, CA (US); David Brian TenHouten, Los Angeles, CA (US); Eahab Nagi El Naga, San Francisco, CA (US); Kenneth James Goodstein, Acton, CA (US); Kurt Jason Mitts, Long Beach, CA (US); Michael Karl Lee, Woodland Hills, CA (US)

(73) Assignee: Intrinsic Power, Inc., Los Angeles, CA (US)

( * ) Notice: Subject to any disclaimer, the term of this patent is extended or adjusted under 35 U.S.C. 154(b) by 298 days.

(21) Appl. No.: 17/478,484

(22) Filed: Sep. 17, 2021

(65) Prior Publication Data

US 2022/0089055 A1  Mar. 24, 2022

Related U.S. Application Data

(60) Provisional application No. 63/080,342, filed on Sep. 18, 2020.

(51) Int. Cl.
*B60L 53/62* (2019.01)
*B60L 53/16* (2019.01)
(Continued)

(52) U.S. Cl.
CPC .............. *B60L 53/62* (2019.02); *B60L 53/16* (2019.02); *B60L 53/305* (2019.02); *B60L 53/51* (2019.02);
(Continued)

(58) Field of Classification Search
CPC .......... B60L 53/16; B60L 53/61; B60L 53/53; B60L 53/62; B60L 53/63; B60L 53/65;
(Continued)

(56) References Cited

U.S. PATENT DOCUMENTS

| 2011/0115425 A1* | 5/2011 | Olsson | B60L 8/003 320/109 |
| 2013/0020993 A1* | 1/2013 | Taddeo | B60L 53/65 320/109 |

(Continued)

*Primary Examiner* — Richard Isla
*Assistant Examiner* — Johali A Torres Ruiz
(74) *Attorney, Agent, or Firm* — Polygon IP, LLP

(57) ABSTRACT

Provided are electric vehicle charging systems (EV charging systems) and methods of operating such systems for charging electric vehicles (EVs). A system, which may be referred to as electric vehicle service equipment (EVSE), comprises one or more EV charging ports (e.g., charge handles) for connecting to EVs. The system may include various features to identify specific EVs. The system also includes a grid connector for connecting to an external power grid and, in some examples, to monitor the power grid conditions (e.g., voltage, AC frequency). The system also includes a system controller, configured to control the power output at each EV charging port based on, e.g., vehicle charging requirements and/or available grid power. The system can also include an integrated battery, serving as a backup and/or an addition to the power grid. Furthermore, in some examples, the system includes a solar connector (e.g., with an integrated inverter) for connection to an external solar array.

20 Claims, 8 Drawing Sheets

(51) Int. Cl.
  *B60L 53/30*  (2019.01)
  *B60L 53/51*  (2019.01)
  *B60L 53/53*  (2019.01)
  *B60L 53/65*  (2019.01)
  *B60L 53/66*  (2019.01)
  *H02J 7/00*  (2006.01)
  *H02J 7/35*  (2006.01)

(52) U.S. Cl.
  CPC .............. *B60L 53/53* (2019.02); *B60L 53/65* (2019.02); *B60L 53/665* (2019.02); *H02J 7/00032* (2020.01); *H02J 7/0042* (2013.01); *H02J 7/35* (2013.01); *B60L 2210/10* (2013.01); *H02J 2207/20* (2020.01)

(58) Field of Classification Search
  CPC ........ B60L 53/66; B60L 53/67; B60L 53/305; B60L 53/665; B60L 2210/10; H02J 7/00032; H02J 7/00034; H02J 7/0013; H02J 7/00712; H02J 7/007194; H02J 7/0042; H02J 7/35; H02J 7/342; H02J 2207/20; H02J 2310/48; Y02T 10/70; Y02T 10/7072; Y02T 90/12; Y02T 90/14; Y02T 90/16
  See application file for complete search history.

(56) References Cited

U.S. PATENT DOCUMENTS

| | | | | |
|---|---|---|---|---|
| 2013/0113413 | A1* | 5/2013 | Harty | H01M 10/465 320/109 |
| 2013/0314037 | A1* | 11/2013 | Caffy | H02J 7/0071 320/109 |
| 2016/0052413 | A1* | 2/2016 | Shimizu | H04W 4/027 700/291 |
| 2017/0318921 | A1* | 11/2017 | Gharabegian | F24S 30/452 |
| 2017/0320399 | A1* | 11/2017 | Yuan | B60L 55/00 |
| 2018/0254643 | A1* | 9/2018 | Paluszek | H02J 1/102 |
| 2018/0281607 | A1* | 10/2018 | Galin | B60L 53/14 |
| 2020/0298722 | A1* | 9/2020 | Smolenaers | H02J 7/345 |

* cited by examiner

VEHICLE CHARGING SYSTEMS AND METHODS OF OPERATING THEREOF

CROSS-REFERENCE TO RELATED APPLICATIONS

This application claims the benefit under 35 U.S.C. § 119(e) of U.S. Provisional Patent Application 63/080,342, filed on 2020 Sep. 18, which is incorporated herein by reference in its entirety for all purposes.

BACKGROUND

EVs (EVs) use electric motors for propulsion, while the power typically comes from batteries. The most common type of EVs is road vehicles. However, rail vehicles, boats, underwater vessels, aircraft, and spacecraft are also within the scope. The development, manufacturing, and overall adoption of EVs have been expanding recently due to the technological developments (e.g., in the battery space) and increased focus on renewable energy. Furthermore, transportation's impact on climate change has been another major driver.

The EV market is rapidly growing with many new EVs recently introduced and sold to individual drivers and businesses. This increasing number of EVs, coupled with the steadily increasing battery capacity (e.g., 40-100 kWh) and charge power (e,g., reaching and exceeding 250 kW in some examples), is already starting to put a strain on the power grid. Supporting incoming fleets of EVs with the existing grid infrastructure will be a major challenge. For example, power grid operators have already and will continue to institute more aggressive residential and commercial rate structures, using tier-based and time-based power rate hikes and fines, to avoid excessive power demands. At the same time, the overall cost of the EV charging infrastructure is projected to be more than $10B in the US alone by 2030. It should be noted that residential charging is currently the largest segment of this infrastructure and is expected to lead in the future.

There is a specific need for new technologies, such as connected smart charging, to support the incoming wave of distributed residential EV charging, within the physical and financial constraints of existing infrastructure.

SUMMARY

Provided are electric vehicle charging systems (EV charging systems) and methods of operating such systems for charging electric vehicles (EVs). A system, which may be referred to as electric vehicle service equipment (EVSE), comprises one or more EV charging ports (e.g., charge handles) for connecting to EVs. The system may include various features to identify specific EVs. The system also includes a grid connector for connecting to an external power grid and, in some examples, to monitor the power grid conditions (e.g., voltage, AC frequency). The system also includes a system controller, configured to control the power output at each EV charging port based on, e.g., vehicle charging requirements and/or available grid power. The system can also include an integrated battery, serving as a backup and/or addition to the power grid. Furthermore, in some examples, the system includes a solar connector (e.g., with an integrated inverter) for connection to an external solar array.

DETAILED DESCRIPTION

Figure 1:
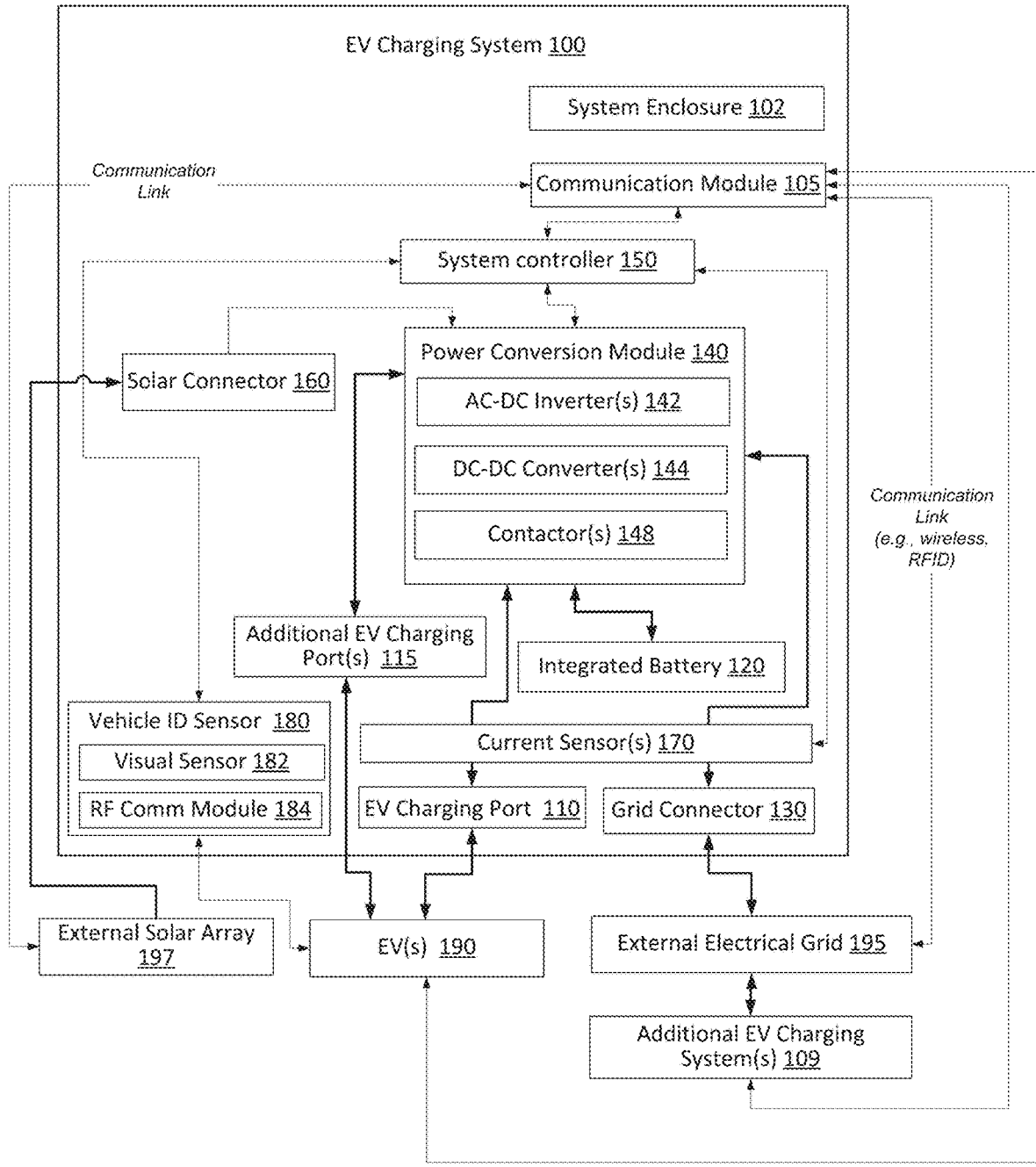
FIG. 1 is a block diagram of an EV charging system, illustrating various components of the system, in accordance with some examples.

Its the following description, numerous specific details are outlined in order to provide a thorough understanding of the presented concepts. In some examples, the presented concepts are practiced without some or all of these specific details. In other instances, well-known process operations have not been described in detail so as not to unnecessarily obscure the described concepts. While some concepts will be described in conjunction with the specific examples, it will be understood that these examples are not intended to be limiting.

Introduction

EV charging systems are configured to connect to external electrical grids and to charge EVs. In some examples, one EV charging system is able to charge multiple EVs at the same time. The EV charging is performed according to a charging profile, generated based on the charging requirements (e.g., received from the EVs) and the grid power availability (e.g., received and/or measured from the external electrical grid). For example, the EV charging requirements may include start time, charge power, and/or the overall electrical energy needed to complete the charge. The EV charging system can continuously balance these requirements with the grid power availability, which can change over time (e.g., due to other power demands on this grid). In some examples, the EV charging system generates a specific charging profile for each EV connected to the system and continuously updates these profiles. This process may be also referred to as "smart-charging".

In some examples, the smart-charging comprises an assessment of the external electrical grid, analysis of one or more EVs connected to the EV charging portions (and/or user profiles associated with these EVs), charger networked communication, and/or determination of the grid rate structures and needs based on access to key databases and real-time metrics. Other input options to smart-charging are also within the scope.

In some examples, an EV charging system is equipped with switching electronics (e.g., AC-DC inverter) to provide a direct supply of DC power to the EV charging port and, through this port, to the EV being charged. Furthermore, the same set (or a different set) of switching electronics provide for the electrical integration of an external solar panel array to the system. For example, a system can be equipped with a solar connector for connecting one or more external solar arrays. The system eliminates the need for a separate solar array inverter in residential or commercial applications, where EV charging and solar power generation are co-located.

In some examples, a networked approach is used among multiple EV charging systems connected to the same external electrical grid. Specifically, multiple EV charging systems communicate with each other (e.g., either directly or through a central system service) and synchronize their operations (e.g., using complementary protocols). For example, multiple EV charging systems can adjust their power consumptions to collectively remain within the constraints of the grid. These constraints can be (a) detected by one or all EV charging systems, (b) inferred by publicly available information (e.g., receive an update from the grid), and/or (c) obtained via database cross-reference or user input.

In some examples, a single EV charging system comprises multiple EV charging ports. The system controller ensures that the power (provided to all EV charging ports) is below the limit of the circuit (used by the system). In more specific examples, the system allows the operator or the installer to adjust the charging limits of individual EV charging ports or groups of ports to keep their charging power below the power/current limits from tripping circuit breakers or overstressing transformers. This approach may be referred to as local circuit management. A similar approach can be applied to multiple EV charging systems connected to the same external electrical grid, which may be referred to as grid management. In some examples, both management levels (local and grid) are used by the same EV charging system.

In some examples, the smart-charging features include identifying the EV type (being cha) or even specific EVs vehicle. This identification is achieved, for example, through the visual processing of video or digital images (e.g., obtained using cameras integrated into the charging system) or remote cameras (communicatively coupled to the charging system, e.g., security cameras). In some examples, this identification uses radio-frequency sensing of radio frequency identification (RFID) tags and/or car wireless systems (e.g., communication systems, security systems). In some examples, EVs are identified by various charging signatures, such as the charging voltage, battery response to a charge current, switching frequency, and waveform signatures of EVs' onboard chargers. Furthermore, an EV can be identified by direct communication with the EV or EV's user (e.g., cell phone, or other connected devices). In general, any unique EV parameters (collectively referred to as "vehicle signatures") can be used for identification.

In some examples, an EV charging system includes additional features, such as safety features, (e.g., voltage sensors located in the EV charging ports or, more specifically, in a charging handle and/or in a charge handle cord). Additionally, features for cable management and strain relief of the cord are provided.

Examples of EV Charging Systems

Figure 2:
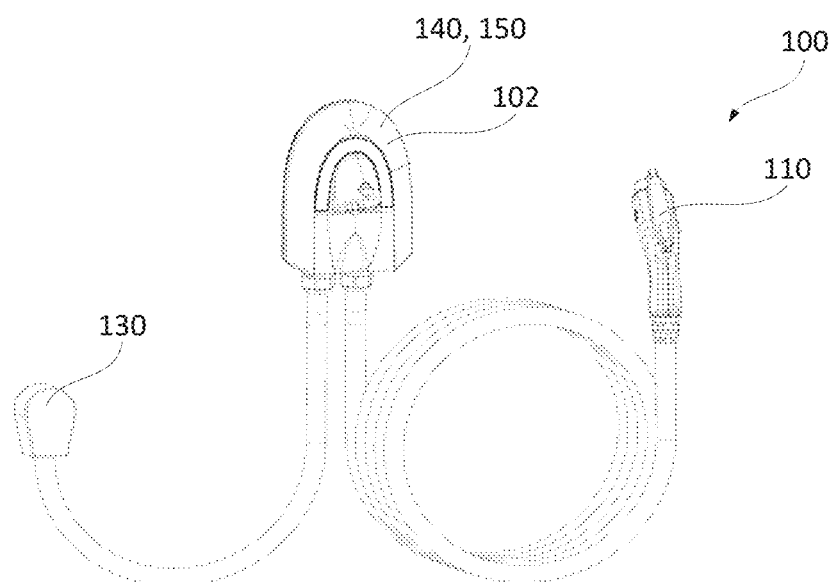
FIG. 2 is an illustration of the EV charging system of FIG. 1, showing a grid connector (as an AC input cable and a plug), an EV charging port, and a system enclosure containing at least a power conversion module and a system controller, in accordance with some examples.
Figure 3:
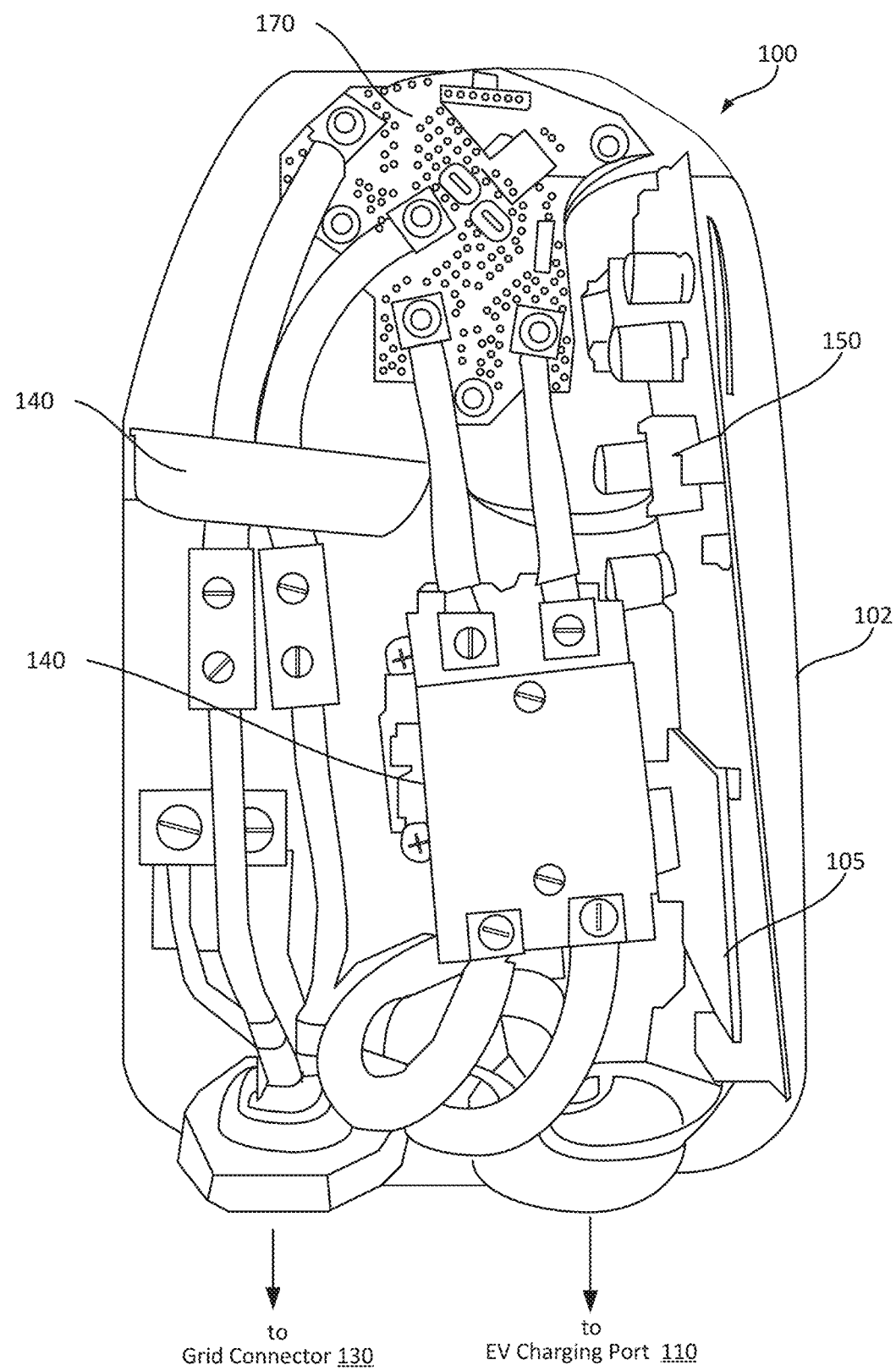
FIG. 3 is an interior photo of an EV charging system, with a part of the enclosure removed, illustrating various interior components of the system, in accordance with some examples.

FIG. 1 is a schematic block diagram representing EV charging system 100, in accordance with some examples. FIG. 2 is a corresponding visual representation of EV charging system 100, in accordance with some examples. Furthermore, FIG. 3 illustrates various internal components of EV charging system 100 packaged within enclosure 102 (with a portion of enclosure 102 removed). EV charging system 100 is configured to charge one or more EVs 190 based on the vehicle charging requirements (e.g., the current state of charge, charging power limit, charge start time, charge end time, minimum state of charge by set time), available grid power, and other external inputs.

EV charging system 100 comprises EV charging port 110, grid connector 130, power conversion module 140, and system controller 150. In some examples, EV charging system 100 also comprises integrated battery 120, which is an optional component. For example, EV charging system 100 can be implemented without integrated battery 120.

EV charging port 110 is coupled to power conversion module 140 and is used for connecting to EV 190 and charging EV 190. It should be noted that EV 190 is not a part of EV charging system 100. In some examples, EV charging system 100 comprises one or more additional EV charging ports 115, which are also electrically coupled to power conversion module 140 and are used for connecting and charging additional EVs 190. As such, EV charging system 100 can be used to charge multiple EVs 190 at the same time. When one or more additional EV charging ports 115 are provided and used, power conversion module 140 is configured to multiplex DC power to among these multiple ports. In some examples, EV charging port 110 comprises a cable and a connecting port as, e.g., is shown in FIG. 2.

Grid connector 130 is connected to power conversion module 140 and is used for connecting to external electrical grid 195. For example, grid connector 130 comprises a cable and an outlet plug, e.g., as shown in FIG. 2, or hardwired. It should be noted that external electrical grid 195 is not a part of EV charging system 100. External electrical grid 195 is used to supply electrical power to EV charging system 100, usually in the form of AC current. Power conversion module 140 converts this AC current into DC current (e.g., using an AC-DC inverter) for use by other components of EV charging system 100.

In some examples, grid connector 130 is an electric vehicle supply equipment (EVSE) AC plug 1. For example, power from external electrical grid 195 is provided to grid connector 130 after passing through a controlled switch. The AC input plug of the EVSE may be a standard plug, or the system may be hard-wired in the wall or a junction box. The other cable connects to grid connector 130. The vehicle charge cable may be stowed on the charging station, and the handle may also be captured by features on the front of EV charging system 100.

Integrated battery 120, when present, is also coupled to power conversion module 140. Integrated battery 120 is used to receive the power from external electrical grid 195 and/or external solar array 197 and to supply the power to EVs 190, e.g., at a level exceeding the current capabilities of external electrical grid 195. Various examples and capacities of integrated battery 120 such as lithium-ion batteries, lithium-metal batteries, nickel-metal-hydride batteries, and the like. The capacity of integrated battery 120 can range from 0.5 kWh to 50 kWh or, more specifically, between 1 kWh to 10 kWh. The capacity of integrated battery 120 depends on the expected power demands from EV charging system 100 (e.g,, number of EVs, charging requirements), capabilities of external electrical grid 195 (e.g., power ratings, expected interruptions), and/or power available from other sources (e.g., another EV and/or external solar array 197).

System controller 150 is communicatively coupled power conversion module 140 and, in some examples, to other components of EV charging system 100 such as communication module 105, vehicle identification sensors 180, and electrical current sensors 170. In some examples, system controller 150 is also communicatively coupled to various external devices and systems, e.g., external electrical grid 195, external solar array 197, EVs 190, additional EV charging systems 109, EV charging system service 191, user devices 193, and the like. Some aspects of these internal and internal communications are described below with reference to FIG. 4A. Various types of communications are within the scope, e.g., wired and/or wireless communication links. For example, system controller 150 can receive various operating parameters of these components. In some examples, system controller 150 can be communicatively coupled to integrated battery 120 to receive the operating parameters of integrated battery 120, such as battery's state of charge, open-circuit voltage (OCV), voltage under a set current, temperature, and the like.

In some examples, system controller 150 is configured to control the electrical power output of at least one of EV charging port 110 or integrated battery 120, if one is present, based on at least one of (1) the charging requirement of EV 190 and (2) the power availability from external electrical grid 195. For example, EV 190 may require a charging power of 50 kW, while external electrical grid 195 can only provide 30 kW (e.g., other devices or EVs connected to external electrical grid 195 at this specific location or this limitation is set by a general grid usage). In this example, the additional 20 kW can be provided from integrated battery 120. Alternatively, if integrated battery 120 is not present or is discharged, EV 190 may be charged at 30 kW (despite the 50 kW requirement). The power may also be changed in real-time as the power company provides updated limitation requests through wireless communication from the meter. For example, the power could be chaged to lower or higher limits, or a request to stop charging altogether.

In some examples, system controller 150 is configured to adjust the power delivery in real-time, e.g., based on input provided to system controller 150 from various internal components (e.g., the SOC/temperature of integrated battery 120), EV 190 (e.g., the SOC and other charging parameters of EV 190), external electrical grid 195 (e.g., changes in the power delivery capabilities of external electrical grid 195), external solar array 197 (e.g., changes in the power delivery capabilities of external solar array 197), additional EV charging systems 109 (e.g., changes in power demand from additional EV charging systems 109), and the like. This feature, coupled with the system connectivity and other control features, allows for both active power management and adaptive power management. For example, reducing the power consumption when a signal is received from external electrical grid 195 (e.g., a power grid operator), or prioritizing charging of EV 190 that is fully discharged before providing charging power to other EVs (e.g., with a higher state of charges). Additional charging examples are provided in the adaptive, active, and demand response sections below.

In some examples, system controller 150 is configured to control the electrical power output of EV charging port 110 based on different charging levels requested from EV 190. For example, EV 190 may request to increase the electrical power output of EV charging port 110 to achieve a desired state of charge by a set time (e.g., to get EV 190 ready for a trip requiring a certain minimal state of charge). In another example, EV 190 may request to decrease the electrical power output of EV charging port 110 or even stop the charging altogether of EV's battery and/or EV's on-board charger reaches or exceeds a set temperature threshold (e.g., EV 190 is being charged on a hot day).

In some examples, system controller 150 is configured to control the electrical power output of EV charging port 110 based on one or more financial functions related to public information on regional rate structures. For example, system controller 150 may store or receive electrical rates from external electrical grid 195 or, more specifically, from the grid operators. System controller 150 may also store or receive instructions from EV 190 about charging preferences (e.g., to minimize the charging cost, to charge as soon as possible, to ensure that EV 190 is ready for an upcoming trip with a set starting time and a set mileage). In the event that the system is being monetized by the operator or owner of the charging station, information about charging time, and needs can be used to optimize charging solutions to optimize costs, or potentially accept higher costs and charge customers an amount that makes providing the charging service acceptable at a given power level.

In some examples, system controller 150 is further configured to control the electrical power output of at least one of EV charging port 110 and/or integrated battery 120 based on the location (in external electrical grid 195) of one or more additional EV charging systems 109. For example, additional EV charging systems 109 and EV charging system 100 can be positioned close to each other thereby straining the power capabilities of external electrical grid 195 at this particular location.

In some examples, system controller 150 is configured to control various safety features of EV charging system 100. For example, system controller 150 can be communicatively coupled to thermal sensors, current sensors, and/or voltage sensors. System controller 150 can use output from these sensors to control the operation of power conversion module 140. For example, system controller 150 is configured to disrupt the power being provided to EV 190 if any sensor values are not within the corresponding set ranges. For example, if a thermocouple output is above an upper limit, or if the temperature is rising above expected steady-state values for a given current level, system controller 150 is configured to disrupt the power being provided to EV 190.

System controller 150 is also configured to communicate with EV 190 (connected to or proximate to EV charging system 100). In some examples, the vehicle communication link is provided by a pilot line, extending to EV charging port 110. The pilot line ensures that EV 190 is ready to receive power. The pilot line also determined if the power drawn from EV charging port 110 by EV 190 is the amount expected by EV 190. In some examples, the vehicle communication is augmented by RF communication from EV charging system 100 to EV 190, e.g., provided by communication module 105.

In some examples, system controller 150 comprises or is connected to visual indicators, such as screens or LED light arrays. For example, EV charging system 100 can be equipped with an LED board. The visual indicators provide indications to the user about charging status, system readiness, or faults.

In some examples, EV charging system 100 further comprises communication module 105 for external communication, e.g., with one or more additional EV charging systems 109. In these examples, system controller 150 is configured to control the electrical power output of at least one of EV charging port 110 and/or integrated battery 120 based on the information received from one or more additional EV charging systems 109. For example, additional EV charging systems 109 can initiate charging of additional EVs and report this process and the additional load on external electrical grid 195) to EV charging system 100, e.g., using communication module 105. In response, EV charging system 100 may reduce its own power consumption (from external electrical grid 195) to prevent overloading external electrical grid 195. In some examples, EV charging system service 191 monitors and controls the power distribution to multiple EV charging systems, e.g., based on user profiles, service requests, and the like. One example of communication module 105 is an Internet of Things (IoT) module. The IoT module is configured to communicate with the Internet (e.g., using a router), additional EV charging systems 109, external electrical grid 195 (e.g., power grid operator's systems and/or a smart meter to which EV charging system 100 is connected). The IoT module can communicate with these other systems using, for example, radio-frequency communication such as Wi-Fi or ZigBee protocols. In some examples, communication module 105 is configured to communicate with other systems via hardwire connections, including Ethernet or LAN.

Figure 4A:
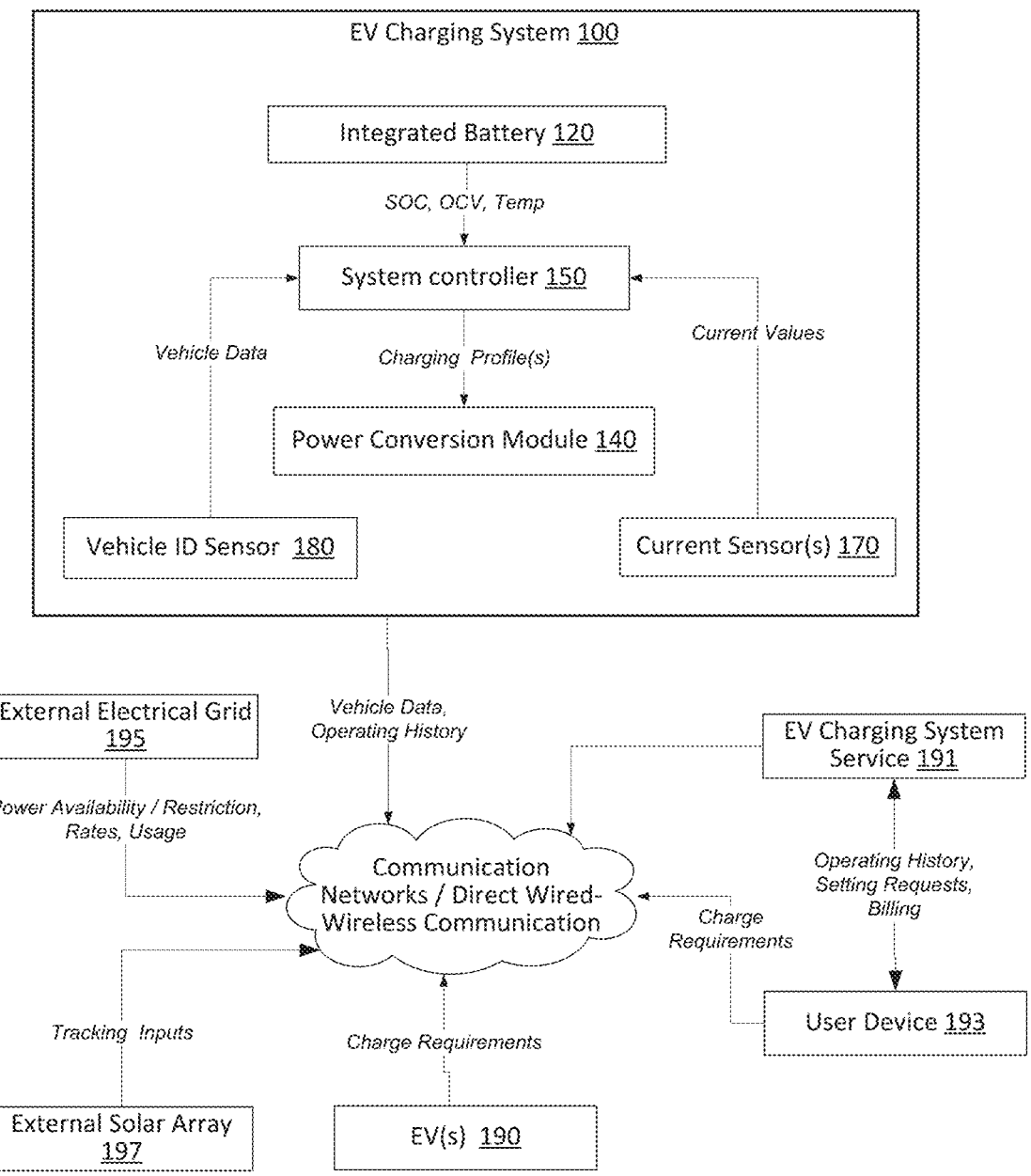
FIG. 4A is a diagram illustrating data flow among various internal components of the EV charging system and also between the system and various external devices and systems, in accordance with some examples.

FIG. 4A illustrates various data flows within EV charging system 100 and between EV charging system 100 and external devices. Many of these data flows are enabled by communication module 105. For example, integrated battery 120 can pass its state of charge, voltage, and temperature information to system controller 150. System controller 150 can use this battery information to determine the available battery capacity and/or battery power. In the same or other examples, vehicle identification sensor 180 can transmits vehicle data (e.g., vehicle image, license plate image, RFID tag data, and the like) to system controller 150. System controller 150 can analyze this vehicle data internally or pass it to EV charging system service 191 for identifying the specific EV and/or any parameters associated with this EV. System controller 150 can also receive current values from current sensors positioned on various power inputs and outputs to EV charging system 100.

Referring to FIG. 4A, the external communication between EV charging system 100 and external devices can be via one or more communication networks, such as the Internet, cellular, Wi-Fi, Bluetooth, and the like (wireless and/or wired). For example, EV charging system 100 ca receive various grid data from external electrical grid 195. Some examples of the grid data include but are not limited to power availability (e.g., at the location of EV charging system 100), expected power outages and/or restrictions, current and upcoming rates, historical usage profile, and the like. In some examples, EV charging system 100 receives tracking inputs from external solar array 197. Furthermore, EVs 190 can communicate with EV charging system 100, e.g., to relate various charge requirements. In some examples, user device 193 (e.g., smartphone, laptop) can be used to retrieve information from EV charging system 100 (e.g., previous usage profile) and provide information to EV charging system 100 (e.g., charge requirements). User device 193 can also communicate with EV charging system service 191, which coordinates operations of EV charging system 100 as well as other EV charging systems as, e.g., is schematically shown in FIG. 4B.

Figure 4B:
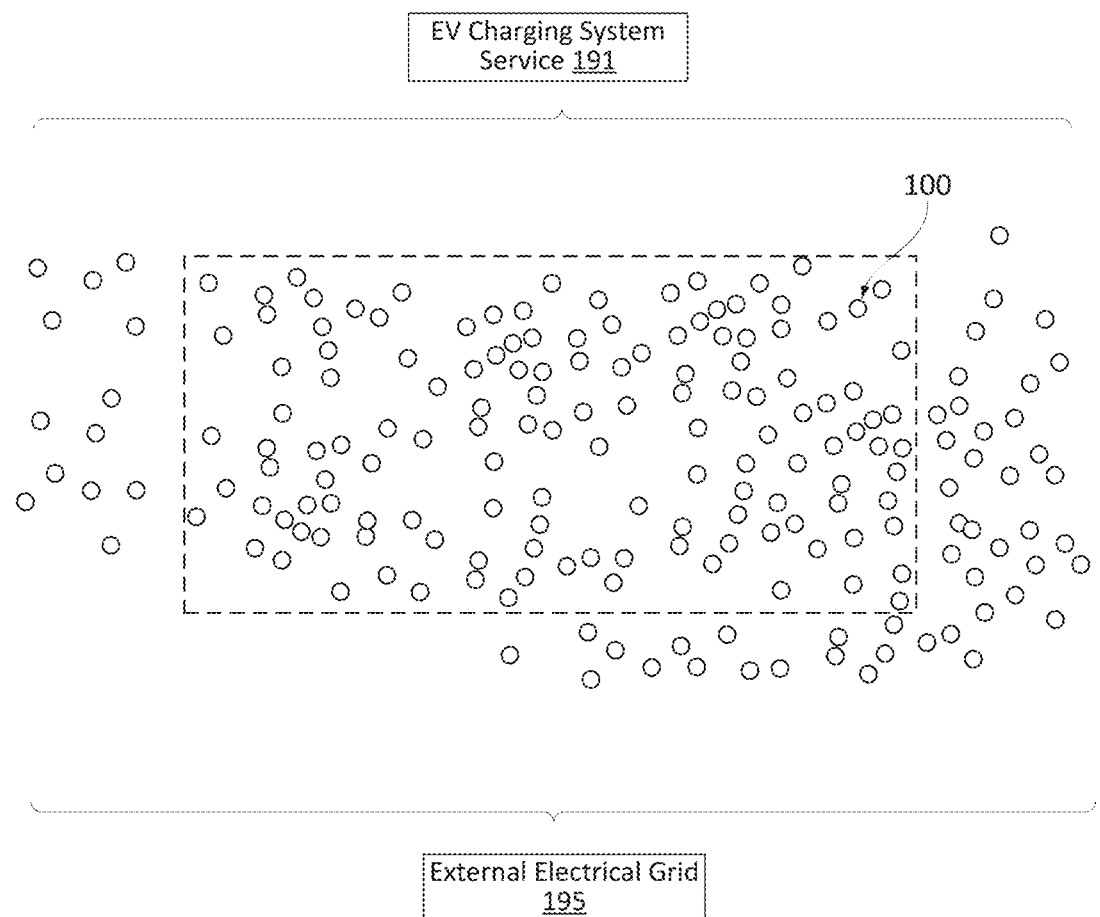
FIG. 4B is a schematic illustration of networked EV charging systems, collectively controlled to balance the utility demand from the grid, in accordance with some examples.

Specifically, FIG. 4B is a schematic illustration of networked EV charging systems 100, communicatively coupled to EV charging system service 191 and collectively controlled to balance the utility demand from external electrical grid 195, in accordance with some examples. Each dot represents one EV charging system 100. Depending on the power capabilities of external electrical grid 195 and the number of networked EV charging systems 100 requesting power, EV charging system service 191 can select a subset of all requesting EV charging system service 191 for operating (e.g., schematically identified with a dotted line boundary). As such, a large number of networked EV charging systems 100 can respond intelligently by reducing the aggregate power consumption within the network are associated with external electrical grid 195. In some examples, external electrical grid 195 and/or EV charging system service 191 can call for power the reduction as demand response in real-time, based on localized or regional consumption strain on external electrical grid 195. For example, each networked EV charging system 100 can report real-time required power demand and/or actually drawn power. Charging system service 191 analyses this information (in real-time) from all networked EV charging systems 100 and performs intelligent throttling, e.g., by changing the actual power drawn from external electrical grid 195. In some examples, this change in the drawn power can be a reduction of power (rather than a complete shutdown) to reduce the charging speed rather than interrupting the charging. Furthermore, this change can be an increase in power, if additional power becomes available from external electrical grid 195.

Returning to FIG. 1, in some examples, EV charging system 100 further comprises solar connector 160 for connecting to external solar array 197. In these examples, power conversion module 140 is electrically coupled to solar connector 160. Furthermore, in more specific examples, system controller 150 is configured to communicatively couple to external solar array 197 to receive solar tracking information. This would allow the system, though outputs to position solar panels in an optimal position and maximize available energy without the need for an independent tracking system.

In some examples, power conversion module 140 comprises one or more AC-DC inverters 142 (e.g,, switching circuits), one or more DC-DC converters 144 (e.g,, transformers), and/or one or more contactors 148. For example, AC-DC inverters 142 are configured to receive power from external electrical grid 195 (e.g., AC current) and convert this power for use by various DC-based components of EV charging system 100. DC-DC converters 144 provide DC/DC direct charging to EV charging port 110 based on the power received from at least one of integrated battery 120, AC-DC inverters 142, and/or solar connector 160.

In some examples, at least one of AC-DC inverters 142 is a bi-directional AC inverter, configured to supply power from integrated battery 120 to EV charging port 110, supply power from integrated battery 120 to grid connector 130, and/or return power to integrated battery 120.

In some examples, power conversion module 140 or, more specifically, AC-DC inverters 142 are configured to perform high-frequency switching, e.g., to provide power or voltage modification (including rectification to DC power). This functionality allows EV charging system 100 to provide high-power DC charging directly to the vehicle battery. Modern EVs have onboard chargers, which are permanently installed components that turn AC grid power into DC power to charge the vehicle batteries. Some EVs have a DC charge port, so external DC conversion equipment can be used to charge the vehicle battery directly. If DC home charging is standardized, EVs can be produced without onboard chargers, saving cost and mass. Additionally, the power levels of larger off-board power electronics could allow for greater charging rates.

In some examples, EV charging system 100 further comprises contactors 148 (e.g., jumpers and/or dual in-line package (DIP) switches. In more specific examples, these components can be used to provide power reduction to EV charging port 110.

In some examples, when EV charging system 100 comprises one or more additional EV charging ports 115 electrically coupled to power conversion module 140, power conversion module 140 is configured to multiplex DC power to EV charging port 110 and to one or more additional EV charging ports 115.

In some examples, EV charging port 110 is configured to detect the charging waveform when connected to EV 190 and to identify EV 190 connected to EV charging port 110 from the charging waveform. For example, the charging station 100 may be configured for voltage detection and logging capability to match the voltage profile over time to detect regular variations in the AC power being drawn on by the vehicle on-board charger. EV charging system 100 can also measure the time from the connection of the proximity sensor in the charge handle to the time that the AC current is drawn down by the load of the charger. Characterization of these characteristics and other variations between the input and output voltages of the charging station 100 can be saved, then used with other saved samples to build a database for detecting vehicle types or to ascribe a high probability of a specific vehicle in a single household.

In some examples, EV charging system 100 further comprises one or more current sensors 170, configured to detect a current at EV charging port 110 and at grid connector 130. One or more current sensors 170 are communicatively coupled to system controller 150. For example, current sensors 170 or another component (e.g., grid connector 130) is configured to determine the available grid power. This available grid power is communicated to system controller 150, which uses this information to control the power supplied to EV charging port 110 and/or the power drawn from integrated battery 120. Various examples of Active Power Management, Adaptive Personal Charging, and Demand Response are described below.

In some examples, current sensors 170 are implemented as a current sense board and/or current sense transformers. Furthermore, current sensors 170 can be configured to measure and verify currents, voltages, frequencies, and waveforms as well as to detect ground faults of AC power passing through EV charging system 100.

In some examples, current sensors 170 or another component (e.g., a power sense board or grid connector 130) is configured to measure real-time voltage and current measurements of all incoming AC lines (e.g., from external electrical grid 195). Specifically, these measurements are performed using a current sensor and a voltage tap at each of the incoming AC lines. The voltage lines and current sensors are sampled in real-time at a rate high enough to generate clear waveforms to understand the power and power quality coming in. In some examples, the number of current sensors is one less than the number of incoming AC lines when a secondary current transformer is included off-board.

In some examples, current sensors 170 or power conversion module 140 comprises a current transformer, configured to measures the net current flow of the two AC lines passing through the transformer. When the lines are equally loaded, the output of the current sensing transformer will read zero voltage. Measurements above an absolute threshold indicate a current fault. The functionality of the transformer can also be verified by running an additional conductor through the transformer and using a selectable current signal provided from system controller 150 to test that a current imbalance is measured.

In some examples, EV charging system 100 further comprises one or more vehicle identification sensors 180 for identifying EV 190 proximate to EV charging system 100 or connected to EV charging port 110. For example, EV charging system 100 comprises one or more visual sensors 182, communicatively coupled to system controller 150 and configured to capture and visual process a vehicle image or a license plate image and to identify EV 190. In the same or other examples, EV charging system 100 further comprises RF communication module 184, communicatively coupled to system controller 150 and configured to communicate with EV 190 and to identify EV 190.

Various modules and components of EV charging system 100 can be incorporated into a single box to simplify the system architecture and reduce cost as, e.g., is schematically shown in FIG. 2. For example, a single enclosure of EV charging system 100 may include EV-AC charging stations, DC fast chargers, solar inverters, battery systems, and/or smart power panels.

Examples of Active Power Management

EV charging system 100, described above with reference to FIG. 1, allows for flexible power consumption, e.g., during vehicle charging. Specifically, the power consumption can be throttled or turned off based on the communication received by EV charging system 100 from external electrical grid 195 (e.g., grid operator's systems.) For example, EV charging system 100 may be turned off based on detecting the poor local power quality. The local power quality can be measured by analyzing the current and voltage of the AC input lines in real-time, establishing the AC waveform of the grid, and then comparing the established AC form to the expected input. More specifically, in a region with 60 Hz AC power, EV charging system 100 can detect that the grid power has a frequency falling below a regional quality threshold (e.g., 1% less than an expected 60 Hz grid input), which indicates a potential upcoming loss of power. Based on this frequency monitoring, EV charging system 100 can temporarily stop the charging/drawing power, e.g., until the grid frequency starts to recover.

In some examples, EV charging system 100 is configured to reduce the charging power, e.g., to manage the fleet of EVs 190 or building power consumption levels to stay below the time of day or monthly energy cost thresholds. For example, charging could be delayed from daytime charging to evening charging time, to take advantage of lower power rates offered by grid operators at night.

In some examples, EV charging system 100 is configured to reduce the power consumption based on detection of the grid power quality. For example, communication module 105 can receive a signal from external electrical grid 195 (e.g., a grid operator or from systems implemented by the operator). System controller 150 can then direct power conversion module 140 to reduce the charging power and/or to reduce the power consumption. In more specific examples, communication module 105 receives a signal via a ZigBee connection with a communication-enabled smart power meter (which is a part of external electrical grid 195). This power reduction capability allows external electrical grid 195 to reduce the power consumption of an individual unit in the desired area.

In some examples, external electrical grid 195 instructs EVs 190 (either directly or through EV charging system 100) to limit the power drawn from EV charging system 100. In other words, at least some of the power control functions are performed at the vehicle level This operation is used, for example, to reduce power grid consumption more significantly over a larger area.

Ire some examples, EV charging system 100 and additional EV charging systems 109 respond intelligently by reducing the aggregate power consumption from the same external electrical grid 195 (e.g., associated with a specified geographic area and/or with a utility substation). For example, external electrical grid 195 can call for power reduction as demand response in real-time, based on localized or regional consumption strain on the local grid.

Examples of Adaptive Personal Charging Capability

In some examples, EV charging system 100 is configured to support ubiquitous distributed EV charging, within the constraints of external electrical grid 195. For example, EV charging system 100 and additional EV charging systems 109 can be part of the same communication and power control network, enabling flexible power consumption, charging EVs in this network within the limits of external electrical grid 195, without complex setup or inputs required by users of EVs 190.

For example, EV charging system 100 is configured to record usage history and track the charging behaviors of individuals to make custom power profiles. The usage is compared to available rate structures based on the system location. For example, energy costs can be minimized by selecting a specific rate structure for EV charging system 100, combined with the specific charging profile for the user. In some examples, this analysis of the custom power profiles is performed remotely on a server that is in communication with EV charging system 100. For example, electric utility costs are reduced by charging EV 190 only the required amount during high-rate windows, reserving the bulk of the charging for lower-rate windows.

In some examples, EV charging system 100 is configured to form an external communication link (e.g., wired, wireless) with external electrical grid 195 (e.g., via a corresponding power meter to which EV charging system 100 is connected). This communication link enables external electrical grid 195 to reduce or stop vehicle charging temporarily, e.g., to reduce local strain on external electrical grid 195.

Examples of Multi-Vehicle Charging Infrastructure

Figure 5A:
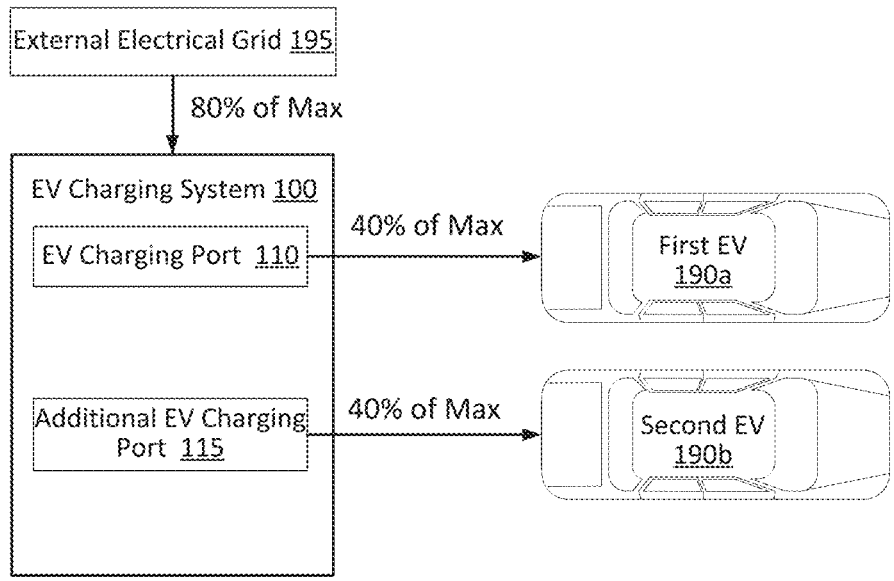
FIGS. 5A and 5B are schematic illustrations of using an EV charging system to charge multiple vehicles, in accordance with some examples.
Figure 5B:
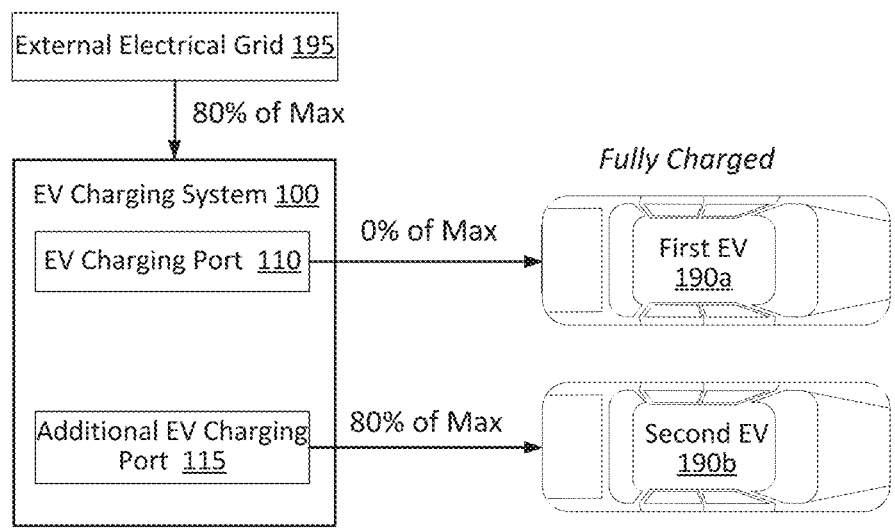
Figure 6A:
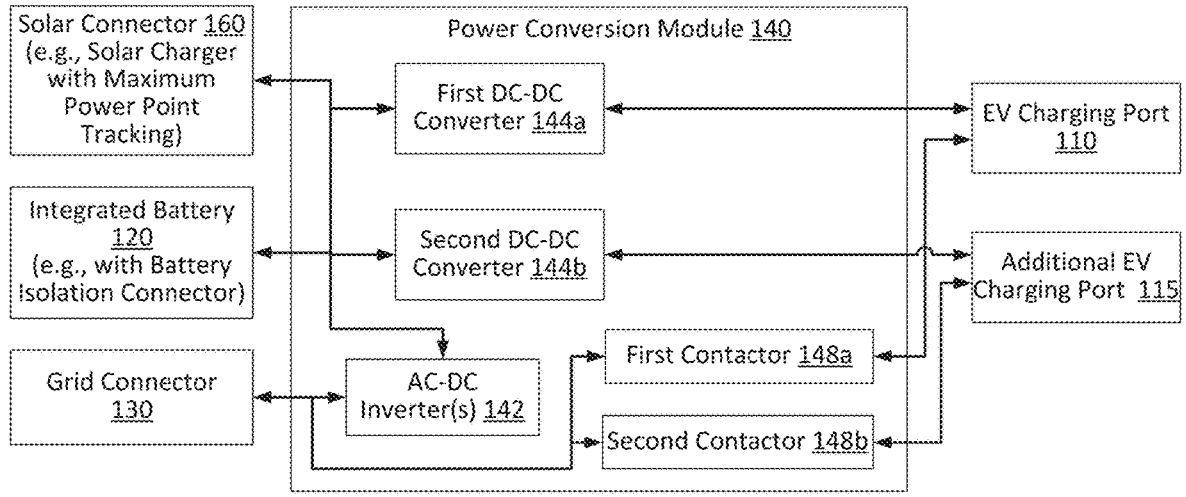
FIG. 6A is a schematic illustration of a power conversion module, configured to achieve the maximum charging concurrently, in accordance with some examples.
Figure 6B:
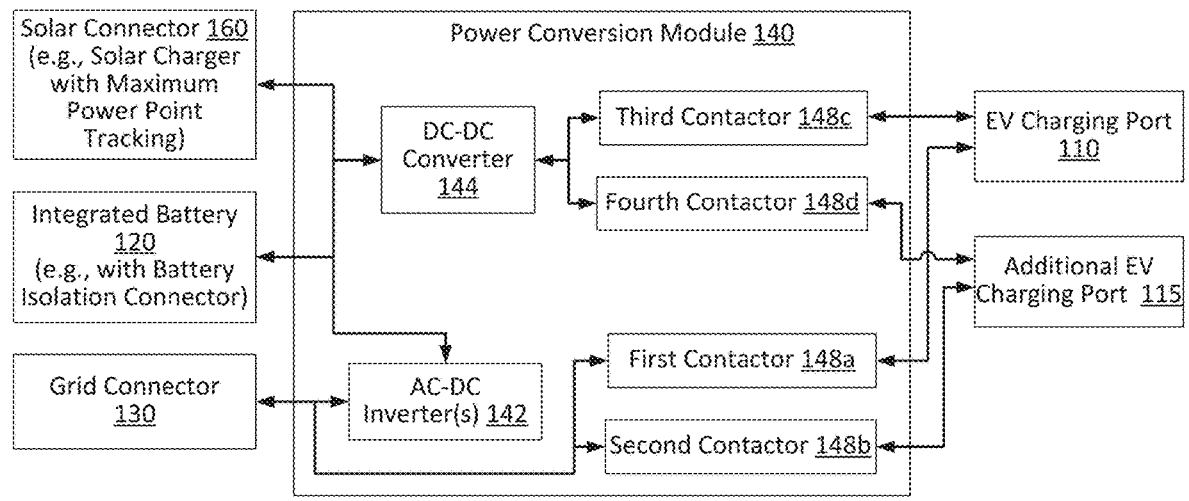
FIG. 6B is a schematic illustration of a power conversion module, configured for multiplexed DC-DC operation, in accordance with some examples.

In some examples, EV charging system 100 is configured to adjust charging power levels, using fixed adjustments or real-time adjustments to accommodate residential or commercial building infrastructure. For example, multiple EVs can be charged at a common location (e.g., in the same residence) using EV charging system 100 as, e.g., is schematically shown in FIGS. 6A and 6B. EV charging system 100 ensures that the total power draw is below the maximum rating of external electrical grid 195 (e.g., 80% of the maximum). When both EVs (e.g., first EV 190*a* and second EV 190*b*) are charged at the same time, EV charging system 100 is configured to share the total power draw (e.g., 40% to each EV) as schematically shown in FIG. 5A. When one EV (e.g., first EV 190*a*) is no longer needs to be charged (e.g., this electric vehicle is fully charged or disconnected from EV charging system 100), EV charging system 100 rebalances the charging rates and, e.g., increase the charging rate to the remaining EVs (e.g., now charging second EV 190*b* at 80% of the maximum) as schematically shown in FIG. 5B.

In some examples, multiple EV charging systems (used in the same location) may have an electrical setting (e.g., including DIP switches or jumper settings) that allow them to limit their individual power levels. This limitation ensures that collectively these multiple EV charging systems stay below the maximum power available, e.g., set by external electrical grid 195. For example, EV charging systems may directly communicate with each other and/or external electrical grid 195 to ensure that the maximum power level of external electrical grid 195 is never exceeded.

In some examples, EV charging system 100 is configured to select power management strategies that allow for charging of a group of vehicles based on the needs of their users, e.g., based on both adaptive and active power management strategies.

For example, in a single-family residence with two EV charging systems 100 for two EVs, the historical usage would be collected over time and would be stored in a database accessible by the distributed units. The system back end could prioritize one first vehicle over the other second vehicle when they return home in the evening. This prioritization could be based on data indicating the first vehicle owner consistently uses all of its battery pack's energy, and sometimes would not complete charging before taking the vehicle out in the morning.

EV Charging Systems with Energy Storage and Renewable Power Integration

As noted above, in some examples, EV charging system 100 comprises integrated battery 120. Integrated battery 120 may be dedicated to one EV charging system 100 or shared among multiple systems in the same location (e.g., in the same house). Integrated battery 120 allows EV charging system 100 to store additional energy available for vehicle charging and/or home backup. For example, integrated battery 120 is used to charge EVs 190 and/or run home systems during power outages (e.g., when external electrical grid 195 is not able to provide any power).

In some examples, the energy from integrated battery 120 is used to provide more charging power to EVs than is otherwise available from external electrical grid 195. This additional power (from integrated battery 120) can be used for fast charging of EVs, charging multiple EVs, charging EVs while operating other high-power electrical devices (e.g., air conditioning, heaters) without the need for increased home infrastructure.

In some examples, when integrated battery 120 is present, system controller 150 or, more specifically, power conversion module 140 (responding to instructions from system controller 150) is configured to manage all AC and DC power flows, e.g., among EV charging port 110 (e.g., DC power), integrated battery 120 (e.g., DC power), and grid connector 130 (e.g., AC power). In more specific examples, EV charging system 100 comprises one or more switching circuits (e.g., integrated into power conversion module 140) to provide either AC power or DC power to EV charging port 110. For example, EV charging system 100 can provide a direct AC power connection between grid connector 130 and EV charging port 110.

As noted above, in some examples, EV charging system 100 comprises solar connector 160 for connecting to external solar array 197. In other words, EV charging system 100 is configured to receive the power (e.g., DC power) locally generated by external solar array 197 or, more generally by renewable sources.

System controller 150 provides power balancing of various power inputs and outputs, including the power received at solar connector 160 (e.g., the solar maximum power point tracking). In some examples, solar connector 160 is equipped with solar tracking electronics.

In addition to reducing the overall system cost, the cost and complexity associated with local installation are significantly reduced by providing a fully integrated system that is all designed to work together. This full integration mitigates issues associated with large system installations with solar, that require complex on-site integration by technicians or electricians.

Power Conversion Examples

Various examples of power conversion module 140 are within the scope. For example, FIG. 6A illustrates an example of power conversion module 140 comprises two DC-DC converters, e.g., first DC-DC converter 144*a* coupled to EV charging port 110 and second DC-DC converter 144*b* coupled to additional EV charging port 115. In other words, each charging port has a dedicated DC-DC converter. Both DC-DC converters can be also coupled to solar connector 150, integrated battery 120, and AC-DC inverter 142 (which is coupled to grid connector 130). EV charging port 110 may be also coupled to grid connector 130, e.g., using first contactor 148*a* (for charging an EV using AC power from the grid). Similarly, additional EV charging port 115 may be also coupled to grid connector 130, e.g., using second contactor 148*b*. Overall, power conversion module 140 (shown in FIG. 6A) enables concurrent charging of multiple EVs utilizing the maximum power of the converters.

FIG. 6B illustrates another example of power conversion module 140, in which one DC-DC converter 144 is shared by multiple EV charging ports. Specifically, DC-DC converter 144 is coupled to EV charging port 110 using third contactor 148*c* and also coupled to additional EV charging port 115 using fourth contactor 148*d*. Other components and connections in this example are the same as in FIG. 6A described above. Power conversion module 140 (shown in FIG. 6A) enables high power charging of multiple EVs by taking turns supplying additional power to one EV at a time. Third contactor 148*c* and fourth contactor 148*d* can be controlled by system controller 150.

In some examples, power conversion module 140 may have an islanding contactor, which could allow EV charging system 100 to provide AC power back to external electrical grid 195 or a local household (e.g., in the case of power interruption). The power can be drawn from one of the EVs connected to EV charging system 100 and/or integrated battery 120. The islanding contactor can isolate EV charging system 100 from external electrical grid 195, e.g., when EV charging system 100 provides its own AC power to the local household.

Additional Active and Adaptive Power Management with Integrated Energy Storage

Power conversion module 140 and, in some examples, integrated battery 120 of EV charging system 100 allows for a higher level of power arbitrage and demand response. For example, during times of local power strain by external electrical grid 195, the power may be put back into external electrical grid 195 by EV charging system 100, e.g., using the power from external solar array 197, integrated battery 120, and/or one or more EVs connected to EV charging system 100. In some examples, EV charging port 110 or, more specifically, the ELISE charge handles provide the auto-load level, drawing down from integrated battery 120. This feature may be used to reduce the max home load or the circuit size while delivering more power to EVs during the charging period.

In some examples, EV charging system 100 comprises multiple EV charging ports or, more specifically, multiple EVSE charge handles, linked to the same bi-directional AC-DC inverter. The bi-directional inverter is connected to integrated battery 120 and/or solar connector 160, which may operate at the same voltage (or not). In some examples, one or both integrated battery 120 and solar connector 160 comprise a dedicated control circuitry, which controls and adjusts various operating parameters (e.g., operating voltage). In some examples, power conversion module 140 is configured to adjust the voltage and frequency to accommodate one or both integrated battery 120 and solar connector 160. In these examples, power conversion module 140 may provide high-power AC charging to multiple EVs connected to EV charging system 100, e.g., by redirecting the supplied energy from integrated battery 120 to various EVs.

In some examples, the charging power and/or order (among different EV charging ports) is prioritized based on historical data, e.g., prioritizing an EV with a lesser charge or an EV that is expected to depart sooner. For example, charging an EV with the longest daily commute can be assigned the highest priority.

In some examples, grid rates are analyzed, e.g., based on information programmed into EV charging system 100 or based on grid information obtained by EV charging system 100 over various connectivity means. EV charging system 100 may be configured to recommend a specific time of use or other grid operator rate structure billing options based on customer usage trends.

In some examples, EV charging system 100 contacts external electrical grid 195 or, more specifically, the grid operator (e.g., automatically or via backend operation) to change customer rate plans to save cost (e.g., assuming permission has been given in advance).

In some examples, EV charging system 100 provides power conversion from AC grid sources and DC battery sources to provide DC direct charge for vehicles with DC charging capability built-in.

Examples of Vehicle Identification

In some examples, EV charging system 100 is configured to implement adaptive charging algorithms, such as vehicle charging prioritization. To provide this functionality, EV charging system 100 is configured to recognize which cars are charging, e.g., using different EVSE charge handles or inductive connections. More specifically, EV charging system 100 comprises one or more features for vehicle identification or, more specifically, vehicle identification sensors 180. For example, EV charging system 100 comprises one or more visual sensors 182 (e.g., cameras) to identify specific vehicles (e.g., using vehicle appearance and license plate number). In some examples, EV charging system 100 is configured to understand and differentiate vehicle power levels and battery size, e.g., based on the make and model information and/or license plate lookup. This identification system is used, e.g., to identify non-EVs parked in space intended for EVs and, in some examples, issue a ticket or request a tow truck.

In some examples, EV charging system 100 comprises RF communication module 184 or, more specifically, an RFID reader, e.g., configured to read various types of RFID tags (e.g., FastTrak devices).

In some examples, the vehicle identification is performed using a current ramp and waveform characterization, e.g., obtained by system controller 150 from power conversion module 140 and/or sensors (e.g., current sensors). Furthermore, EV charging system 100 can monitor the behavior of EV's pilot line, such as delay time from pilot initiation to charge time, to create a charger signature and identify the make and model of EVs connected to EV charging system 100.

In some examples, EV's key fob signature or a MAC address detection is used (e.g., by communication module 105 or vehicle identification sensor 180) when the EV is equipped with Bluetooth and/or Wi-Fi communication features.

In some examples, EV charging system 100 uses various security hooks to report tamper attempts, e.g., attempts to unplug EV charging port 110 from EV 190 without a key fob beacon present. EV charging system 100 can communicate with and disable a home alarm system (e.g., via the Internet or IoT hub) once the homeowner's vehicle is identified by EV charging system 100.

In some examples, EV charging system 100 is joined to a timecard system or any RFID proximity card reader to check vehicles in and out. This security can be achieved by locking the charge handle release button on EV charging port 110.

Examples of Safety-Related Features

In some examples, EV charging system 100 comprises Kelvin connection lines, incorporated into the charge handle writing, running from power conversion module 140 to EV charging port 110. The connection lines are configured to measure the voltage drop from power conversion module 140 to EV charging port 110. EV charging system 100 can then infer cord temperature and/or contact degradation or corrosion within EV charging system 100.

Additionally, thermocouple conductor probes could be added to EV charging port 110 (e.g., the handle or conductors in the harness). Within EV charging system 100, snap mechanisms could also be added to retain thermocouples in contact with the contractor housing or onto internal conductors. These temperature measurements could provide early warning of changes in system resistance. Plausibility checks can be used to determine if temperatures increase relationally with the current.

The charging handle can also have LED lights integrated into the handle. The lights could be forward-facing, to make it easier to plug in the vehicle at night.

A flattened cable arrangement could be achieved by placing the conducting wires side-by-side within a single sheath, to allow users to visualize and prevent the cord twist in charge handles. This could also help with allowing cables to be wound up more efficiently when stowing charge handles.

A fastened rad socket slip connector at the station could be incorporated to allow for cord twist strain relief.

In some examples, the system is mounted with charge handles integrated, or the charge handles may be in remote mounting locations or under vehicles with inductive charging interfaces.

Operating Examples

Figure 7:
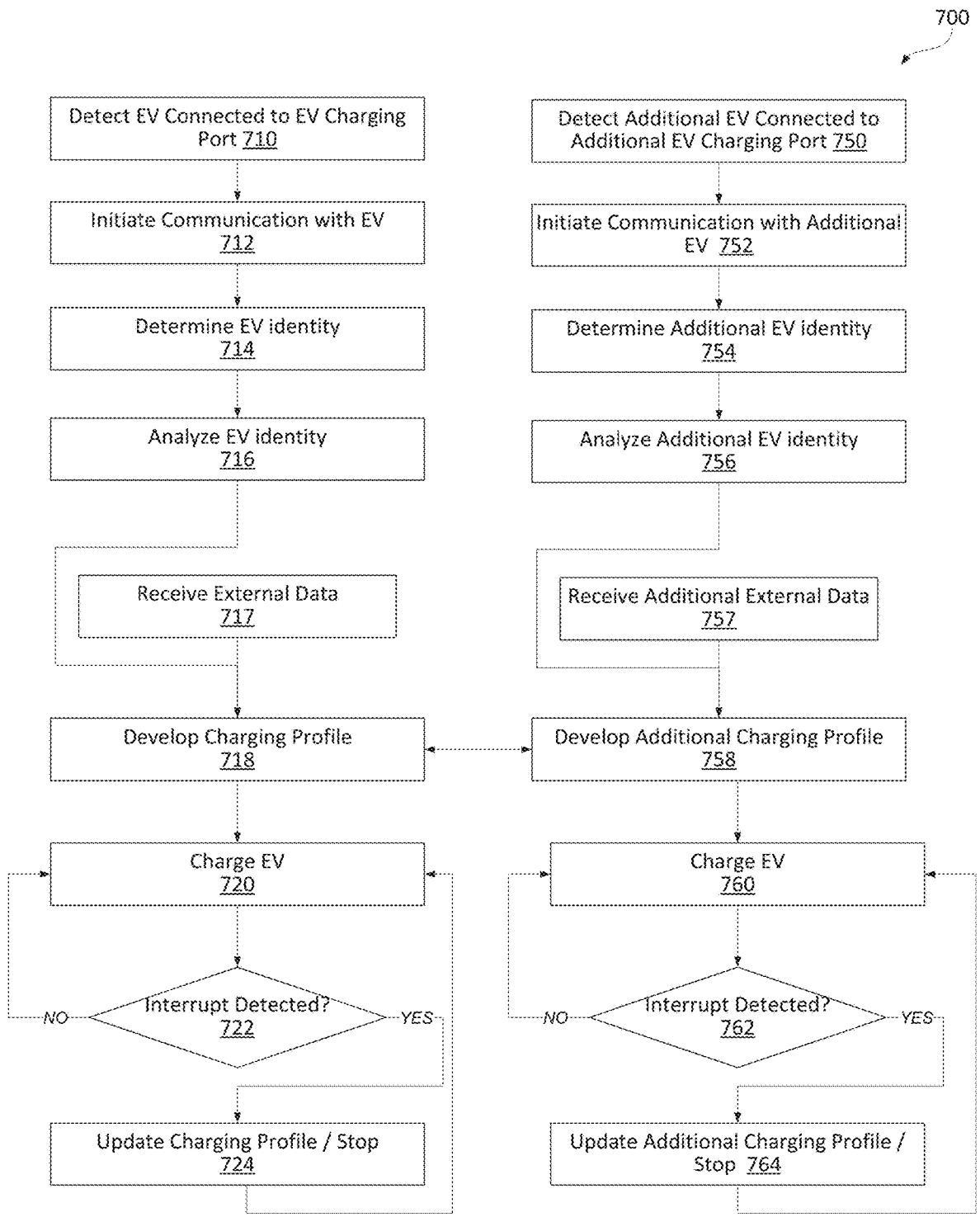
FIG. 7 is a process flowchart corresponding to methods of operating an EV charging system, in accordance with some examples.

FIG. 7 is a process flowchart corresponding to method 700, illustrating various operations of EV charging system 100, in accordance with some examples. It should be noted that many of these operations are performed by system controller 150, which can be implemented in hardware and/or software. For example, system controller 150 can be a specially purposed computer with various computer code stored in the memory of system controller 150 and executed by the processor of system controller 150. Various examples and features of EV charging system 100 are described below.

Method 700 may commence with system controller 150 detecting (block 710) EV 190 connected to EV charging port 110. For example, a handle of EV charging port 110 may be plugged by a user into a charging port of EV 190. In some examples, system controller 150 proceeds with initiating (block 712) communication with EV 190, e.g., to obtain vehicle charging requirements.

In some examples, method 700 proceeds with system controller 150 determining (block 714) the identity of EV 190 connected to EV charging port 110. For example, system controller 150 instructs vehicle identification sensor 180 or, more specifically, visual sensor 182 to capture an image of EV 190. The image may be sent to a cloud-based server for matching of the vehicle type and/or license plate. In some examples, the image-based identification is verified with a Wi-Fi connection to EV 190, e.g., using communication module 105 with Wi-Fi capabilities system.

Method 700 proceeds with system controller 150 analyzing (block 715) the identity of EV 190 connected to EV charging port 110. For example, the vehicle identity may have a corresponding vehicle profile, which system controller 150 can retrieve (e.g., from a cloud server) using communication module 105. In some examples, the vehicle profile comprises charge requirements, local utility rate information, and/or other related information.

In some examples, system controller 150 receives (block 717) external data from a server (e.g., a cloud-based service). Some examples of this external data include, but are not limited to, overall grid conditions, flexible rate updates, expected power shutdowns, other vehicles being charge from the same external electrical grid 195, and the like.

This vehicle profile (and any external data, if available) can be used by system controller 150 to develop (block 718) a charging profile (e.g., start time for charging, charging power, and the like). This profile can account for user preferences (e.g., minimize costs, having a set minimal charge by a set time, and the like).

In some examples, the charging profile is developed based on historical data for this specific vehicle/user. This historical data may be aggregated by system controller 150 and/or an external server (e.g., a cloud-based service). For example, the historical data may indicate various patterns of using this particular vehicle, e.g., the vehicle remains connected to EV charging system 100 for at least 7 hours every night, while the projected charging time is 2 hours based on the current state of charge. In some examples, the charge time is determined by system controller 150 by initiating a short test charge to characterize the power draw, voltage, and switching characteristics compared to a database of historical characterizations of this vehicle and models similar to it. For example, the time of use cost per kWh reduces in 1 hour, so the charging plan is to wait one hour, then charge at full AC until the vehicle is fully charged. In this example, the vehicle is charged without using energy from the charging station's integrated battery system.

Method 700 proceeds with charging (block 720) EV 190 by supplying the power to EV charging port 110 in accordance with the charging profile. In some examples, the charging continues until an interrupt is detected (block 722) (e.g., either in the charging profile) or an external interrupt. Some examples of interrupts include, but are not limited to, grid condition changes, local power availability changes (e.g., an additional vehicle started charging in the same location), vehicle condition changes (e.g., the vehicle is fully charged, vehicle battery temperature), and the like. In some examples, an external interrupt may provide a new charging profile, which power conversion module 140 uses to continue charging. In some examples, during the charging period, the charge rate instructions are provided continuously by system controller 150 to power conversion module 140 and also to EV 190 (e.g., via a Pilot circuit).

Method 700 may proceed with detecting (block 750) an additional EV connected to EV charging port 110, e.g., to additional EV charging port 115. System controller 150 proceeds with initiating (block 752) communication with the additional EV, e.g., to obtain vehicle charging requirements and determining (block 754) the identity of the additional EV. Method 700 then proceeds with system controller 150 analyzing (block 756) the identity of the additional EV, receiving (block 757) additional external data from a server (e.g., a cloud-based service), and developing an additional charging profile (block 758). These operations may be similar to operations corresponding to blocks 710-718, described above. However, the additional charging profile is developed based on the charging profile for the initial vehicle, the state of charge of the initial vehicle, the overall power capabilities of EV charging system 100, and other factors.

For example, the additional EV is connected (block 750) 2 hours after the charging of the initial EV started (in block 720). System controller 150 may initiate communication (e.g., via Wi-Fi) with the additional to receive this vehicle's charging requirements (e.g., estimated at 120 kWh). The additional charging profile may limit the power supplied to the additional EV if the initial vehicle is still charging (e.g., to complete the charging of the initial vehicle). This may be referred to as a first connect-first charge approach. Alternatively, the charging power of the initial EV may be reduced to accommodate the faster charging of the additional EV. For example, the additional EV may have a higher priority than the initial EV. In some examples, the total available power is split evenly between the two EVs connected to EV charging system 100. Other ratios and charge powers could have been determined based on expected available charge time, vehicle state of charge, grid conditions, or user preferences. Furthermore, it should be noted that the charging profile for the initial vehicle may be changed when the additional charging profile is developed. In some examples, a user may make changes to one or more charging profiles using, e.g., a smartphone, a computer, or any other user device. The user device may connect directly to EV charging system 100 or through a backend server.

In some examples, when the power from integrated battery 120 is used when developing the initial charging profile and/or the additional charging profile. For example, when the additional EV is connected EV charging system 100, the power capabilities of external electrical grid 195 may not be sufficient to charge both vehicles at the desired rate/time. In this example, the power from integrated battery 120 is used to supplement the power from external electrical grid 195.

Method 700 proceeds with charging (block 760) the additional EV according to the additional charging profile, monitoring (block 762) for interrupts, and updating (block 764) the additional charging profile when interrupts are detected.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An electric vehicle charging system comprising:
   an electric vehicle charging port, for connecting to an electric vehicle and charging the electric vehicle;
   an integrated battery;
   a grid connector, for connecting to an external electrical grid;
   a power conversion module, electrically coupled to each of the electric vehicle charging port, the integrated battery, and the grid connector and comprising a bi-directional AC-DC inverter configured to supply AC power to the electric vehicle charging port; and
   a system controller, communicatively coupled to at least the power conversion module and to the integrated battery,
   wherein the integrated battery is configured to pass state of charge of the integrated battery, voltage of the integrated battery, and temperature of the integrated battery to the system controller,
   wherein the system controller is configured to control electrical power output of at least one of the electric vehicle charging port or the integrated battery based on at least one of charging requirement of the electric vehicle and power availability from the external electrical grid, and
   wherein the electric vehicle charging port is configured to detect a charging waveform when connected to the electric vehicle and to identify the electric vehicle connected to the electric vehicle charging port from the charging waveform using voltage detection and logging capability to match a voltage profile over time to detect regular variations in the AC power being drawn on by a vehicle on-board charger of the electric vehicle.

2. The electric vehicle charging system of claim 1, wherein the system controller is configured to communicatively couple to the external electrical grid.

3. The electric vehicle charging system of claim 2, wherein the system controller is configured to communicatively couple to the external electrical grid using a wireless communication link.

4. The electric vehicle charging system of claim 1, further comprising a solar connector for connecting to an external solar array, wherein the power conversion module is electrically coupled to the solar connector.

5. The electric vehicle charging system of claim 4, wherein the system controller is configured to communicatively couple to the external solar array to receive solar tracking information.

6. The electric vehicle charging system of claim 1, wherein the power conversion module is further configured to provide DC/DC direct charging to the electric vehicle charging port based on power received from at least one of the integrated battery or the grid connector.

7. The electric vehicle charging system of claim 1, further comprising one or more additional vehicle charging ports electrically coupled to the power conversion module,
   wherein the power conversion module is configured to multiplex DC power to the electric vehicle charging port and to the one or more additional electric vehicle charging ports.

8. The electric vehicle charging system of claim 1, further comprising a set of jumpers or other physical switches, configured to provide power reduction to the electric vehicle charging port.

9. The electric vehicle charging system of claim 1, further comprising one or more current sensors, configured to detect a current at the electric vehicle charging port and at the grid connector, the one or more current sensors are communicatively coupled to the system controller.

10. The electric vehicle charging system of claim 1, further comprising one or more visual sensors, communicatively coupled to the system controller and configured to capture and visual process a vehicle image or a license plate image and to identify the electric vehicle.

11. The electric vehicle charging system of claim 1, further comprising an RF communication module, communicatively coupled to the system controller and configured to communicate with the electric vehicle and to identify the electric vehicle.

12. The electric vehicle charging system of claim 11, wherein the system controller is configured to control the electrical power of output the electric vehicle charging port based on different charging levels requested from the electric vehicle.

13. The electric vehicle charging system of claim 1, wherein the system controller is configured to control the electrical power output of the electric vehicle charging port based on one or more financial functions related to public information on regional rate structures.

14. The electric vehicle charging system of claim 1, further comprising a communication module for communicating to one or more additional electric vehicle charging systems.

15. The electric vehicle charging system of claim 14, wherein the system controller is configured to control the electrical power output of at least one of the electric vehicle charging port or the integrated battery based on information received from the one or more additional electric vehicle charging systems.

16. The electric vehicle charging system of claim 15, wherein the system controller is further configured to control the electrical power output of at least one of the electric vehicle charging port or the integrated battery based on location, in the external electrical grid, of the one or more additional vehicle charging systems.

17. The electric vehicle charging system of claim 1, wherein the power conversion module is configured to perform high-frequency switching.

18. The electric vehicle charging system of claim 1, wherein the system controller is configured to measure and store the regular variations in the AC power, present at the electric vehicle charging port, while the AC power is drawn on by the vehicle on-board charger of the electric vehicle in a database for at least one of (a) detecting vehicle types, (b) ascribing a probability of a specific vehicle in a single household, and (c) determining the state of charge of the integrated battery.

19. The electric vehicle charging system of claim 18, wherein the system controller is further configured to measure time between (a) connecting the electric vehicle charging port to the electric vehicle and (b) drawing the AC power current by the vehicle on-board charger of the electric vehicle.

20. The electric vehicle charging system of claim 1, wherein the charging waveform is detected by sampling real-time voltage and current measurements at a set rate to determine power levels and power quality of the AC power.

* * * * *